(12) United States Patent
Shveidel et al.

(10) Patent No.: US 12,164,498 B2
(45) Date of Patent: Dec. 10, 2024

(54) SYSTEM AND METHOD FOR SHARING WRITE LOCKS FOR SPECIFIC OPERATION TYPES

(71) Applicant: Dell Products, L.P., Round Rock, TX (US)

(72) Inventors: Vladimir Shveidel, Pardes-Hana (IL); Bar David, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 17/968,952

(22) Filed: Oct. 19, 2022

(65) Prior Publication Data

US 2024/0134839 A1   Apr. 25, 2024
US 2024/0232160 A9   Jul. 11, 2024

(51) Int. Cl.
*G06F 16/00* (2019.01)
*G06F 16/23* (2019.01)

(52) U.S. Cl.
CPC ...... *G06F 16/2343* (2019.01); *G06F 16/2379* (2019.01)

(58) Field of Classification Search
CPC .................. G06F 16/2343; G06F 16/2379
USPC .................................................. 707/704
See application file for complete search history.

(56) References Cited

U.S. PATENT DOCUMENTS

| | | | |
|---|---|---|---|
| 11,093,169 B1* | 8/2021 | Shveidel | G06F 3/064 |
| 2006/0101081 A1* | 5/2006 | Lin | G06F 16/2343 |
| 2017/0024140 A1* | 1/2017 | Shivanand | G06F 3/065 |
| 2021/0279229 A1* | 9/2021 | Parasnis | G06F 16/27 |
| 2021/0286537 A1* | 9/2021 | Shveidel | G06F 3/061 |

\* cited by examiner

*Primary Examiner* — Monica M Pyo
(74) *Attorney, Agent, or Firm* — Brian J. Colandreo; Heath M. Sargeant; Holland & Knight LLP

(57) ABSTRACT

A method, computer program product, and computing system for receiving a plurality of requests to perform an operation of a first operation type on a storage object. A shared write lock associated with the first operation type is provided to each thread requesting to perform an operation of the first operation type. Concurrent requests to perform operations of the first operation type on the storage object are processed by each requesting thread based upon, at least in part, the shared write lock associated with the first operation type provided to each requesting thread.

18 Claims, 8 Drawing Sheets

SYSTEM AND METHOD FOR SHARING WRITE LOCKS FOR SPECIFIC OPERATION TYPES

BACKGROUND

Storing and safeguarding electronic content may be beneficial in modern business and elsewhere. Accordingly, various methodologies may be employed to protect and distribute such electronic content.

For example, consider a high performance multithread application storage cluster. Storage objects (e.g., mapping pages, data blocks, metadata pages, etc.) may be accessed from different types of independent flows for various operations (e.g., read operations, write operations, etc.). In some scenarios, multiple write requests may seek access to metadata pages by acquiring exclusive locks. This may cause lock contention leading to performance degradation. In one example, mapping page lock contention may occur during flushing of requests for particular mapping pages. In this example, mapping page contention prevents flushing threads from utilizing storage system resources (e.g., CPU cycles) efficiently.

SUMMARY OF DISCLOSURE

In one example implementation, a computer-implemented method executed on a computing device may include, but is not limited to, receiving a plurality of requests to perform an operation of a first operation type on a storage object. A shared write lock associated with the first operation type is provided to each thread requesting to perform an operation of the first operation type. Concurrent requests to perform operations of the first operation type on the storage object are processed by each requesting thread based upon, at least in part, the shared write lock associated with the first operation type provided to each requesting thread.

One or more of the following example features may be included. The first operation type may be a leaf mapping page allocation operation. The first operation type may be a virtual data block pointer update operation. processing the concurrent requests includes processing each operation of the first operation type as a storage object delta. A write request for the storage object may be received and it may be determined whether a thread has a shared write lock associated with the first operation type for the storage object. In response to determining that a thread has a shared write lock associated with the first operation type for the storage object, an exclusive write lock may be provided when the shared write lock associated with the first operation type is released. A read request for the storage object may be received and it may be determined whether a thread has a shared write lock associated with the first operation type for the storage object. In response to determining that a thread has a shared write lock associated with the first operation type for the storage object, a read lock may be provided when the shared write lock associated with the first operation type is released. A request to perform an operation of a second operation type on the storage object may be received and it may be determined whether a thread has a shared write lock associated with the first type of operation for the storage object. In response to determining that the thread has a shared write lock associated with the first operation type for the storage object, a shared write lock associated with the second type of operation may be provided when the shared write lock associated with the first type of operation is released.

In another example implementation, a computer program product resides on a computer readable medium that has a plurality of instructions stored on it. When executed by a processor, the instructions cause the processor to perform operations that may include, but are not limited to, receiving a plurality of requests to perform an operation of a first operation type on a storage object. A shared write lock associated with the first operation type is provided to each thread requesting to perform an operation of the first operation type. Concurrent requests to perform operations of the first operation type on the storage object are processed by each requesting thread based upon, at least in part, the shared write lock associated with the first operation type provided to each requesting thread.

One or more of the following example features may be included. The first operation type may be a leaf mapping page allocation operation. The first operation type may be a virtual data block pointer update operation. processing the concurrent requests includes processing each operation of the first operation type as a storage object delta. A write request for the storage object may be received and it may be determined whether a thread has a shared write lock associated with the first operation type for the storage object. In response to determining that a thread has a shared write lock associated with the first operation type for the storage object, an exclusive write lock may be provided when the shared write lock associated with the first operation type is released. A read request for the storage object may be received and it may be determined whether a thread has a shared write lock associated with the first operation type for the storage object. In response to determining that a thread has a shared write lock associated with the first operation type for the storage object, a read lock may be provided when the shared write lock associated with the first operation type is released. A request to perform an operation of a second operation type on the storage object may be received and it may be determined whether a thread has a shared write lock associated with the first type of operation for the storage object. In response to determining that the thread has a shared write lock associated with the first operation type for the storage object, a shared write lock associated with the second type of operation may be provided when the shared write lock associated with the first type of operation is released.

In another example implementation, a computing system includes at least one processor and at least one memory architecture coupled with the at least one processor, wherein the at least one processor is configured to receive a plurality of requests to perform an operation of a first operation type on a mid-level mapping page. A shared write lock associated with the first operation type is provided to each thread requesting to perform an operation of the first operation type. Concurrent requests to perform operations of the first operation type on the mid-level mapping page are processed by each requesting thread based upon, at least in part, the shared write lock associated with the first operation type provided to each requesting thread.

One or more of the following example features may be included. The first operation type may be a leaf mapping page allocation operation. The first operation type may be a virtual data block pointer update operation. processing the concurrent requests includes processing each operation of the first operation type as a mid-level mapping page delta. A write request for the mid-level mapping page may be received and it may be determined whether a thread has a shared write lock associated with the first operation type for the mid-level mapping page. In response to determining that a thread has a shared write lock associated with the first operation type for the mid-level mapping page, an exclusive write lock may be provided when the shared write lock associated with the first operation type is released. A read request for the mid-level mapping page may be received and it may be determined whether a thread has a shared write lock associated with the first operation type for the mid-level mapping page. In response to determining that a thread has a shared write lock associated with the first operation type for the mid-level mapping page, a read lock may be provided when the shared write lock associated with the first operation type is released. A request to perform an operation of a second operation type on the mid-level mapping page may be received and it may be determined whether a thread has a shared write lock associated with the first type of operation for the mid-level mapping page. In response to determining that the thread has a shared write lock associated with the first operation type for the mid-level mapping page, a shared write lock associated with the second type of operation may be provided when the shared write lock associated with the first type of operation is released.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
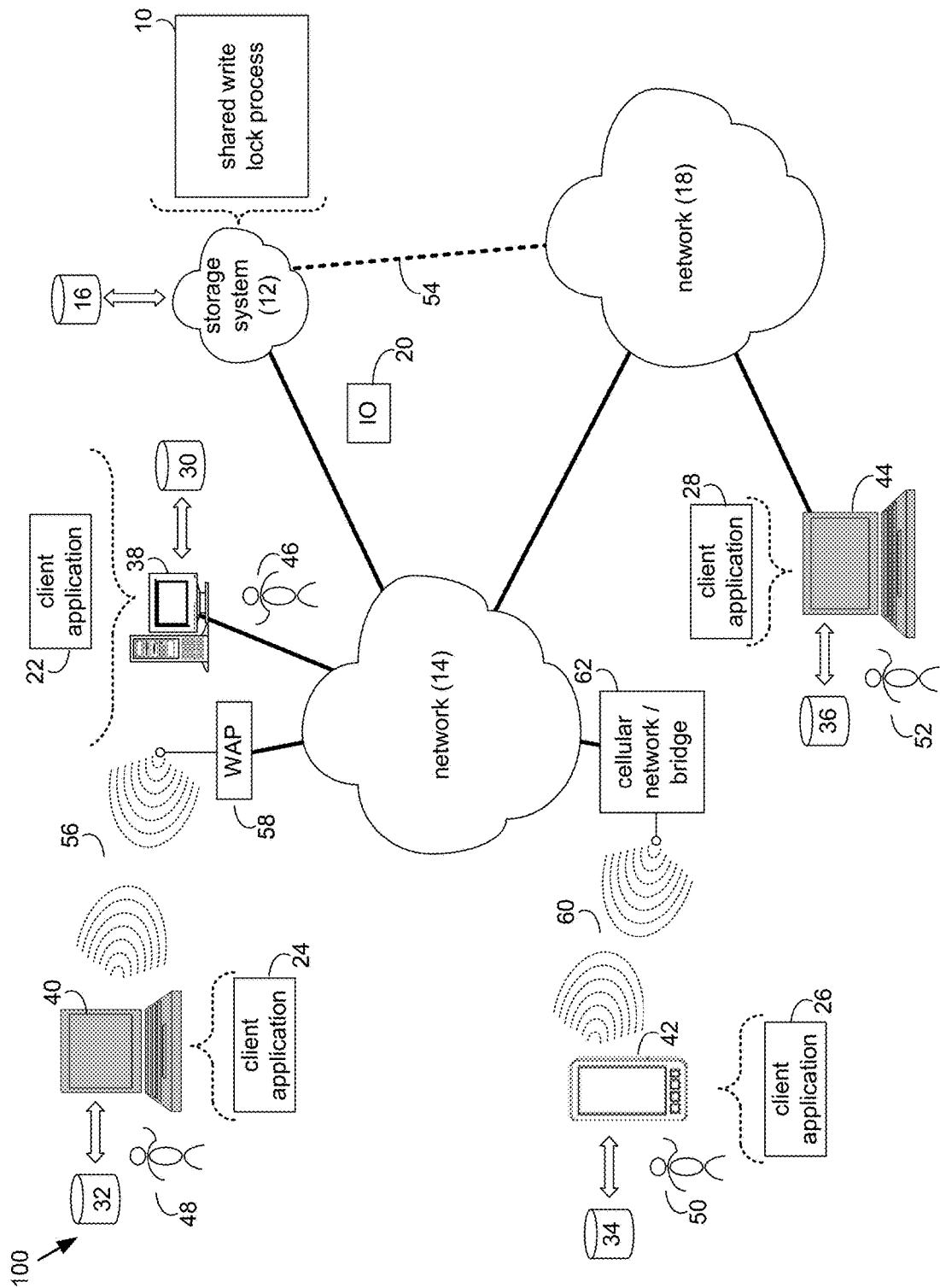
FIG. 1 is an example diagrammatic view of a storage system and a shared write lock process coupled to a distributed computing network according to one or more example implementations of the disclosure.

System Overview:

Referring to FIG. 1, there is shown shared write lock process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of shared write lock process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of shared write lock process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a shared write lock process, such as shared write lock process 10 of FIG. 1, may include but is not limited to, receiving a plurality of requests to perform an operation of a first operation type on a storage object. A shared write lock associated with the first operation type is provided to each thread requesting to perform an operation of the first operation type. Concurrent requests to perform operations of the first operation type on the storage object are processed by each requesting thread based upon, at least in part, the shared write lock associated with the first operation type provided to each requesting thread.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
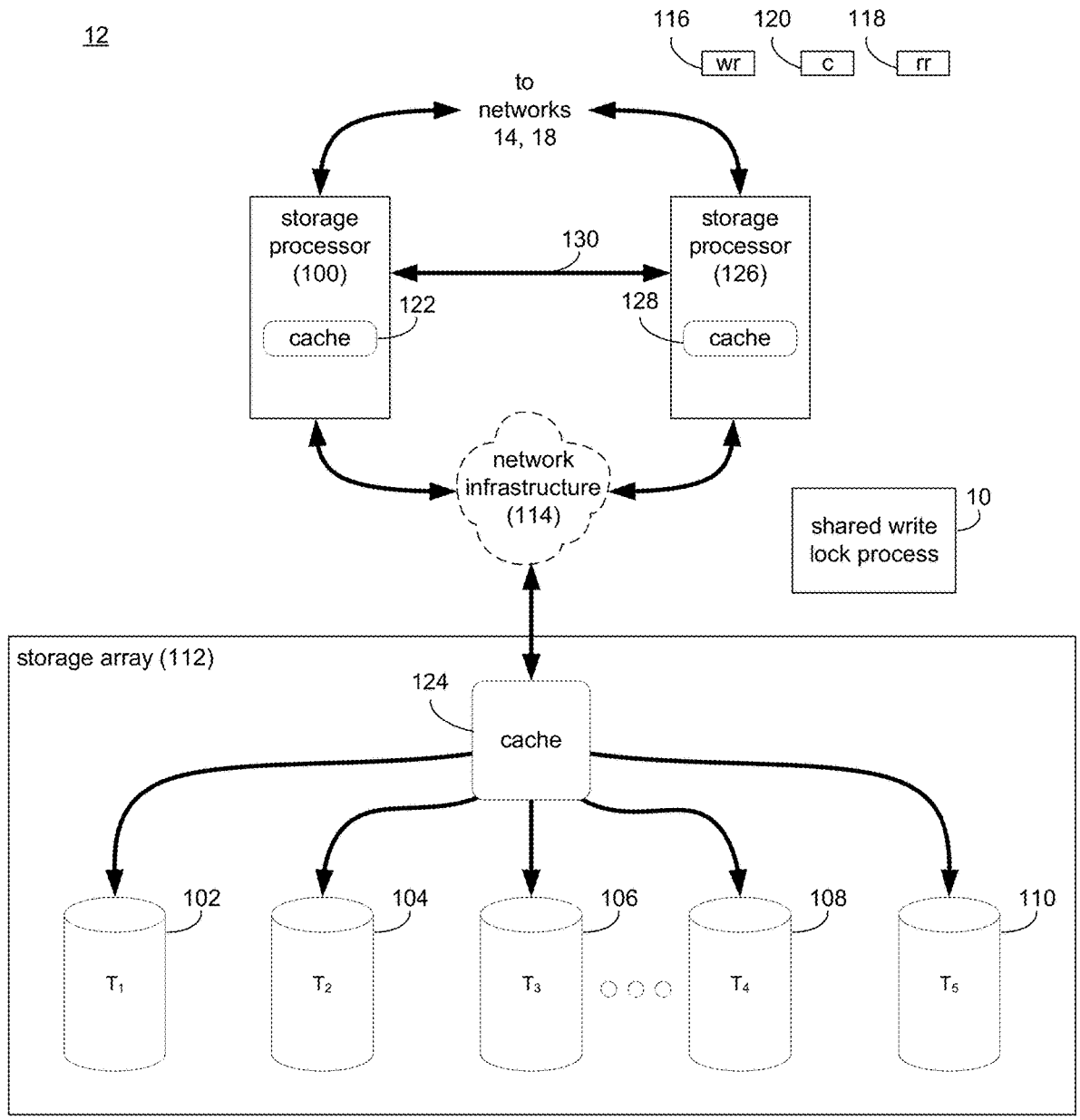
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of shared write lock process 10. The instruction sets and subroutines of shared write lock process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of shared write lock process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of shared write lock process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of shared write lock process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of shared write lock process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of shared write lock process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/input-output operations per second (IOPs) than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
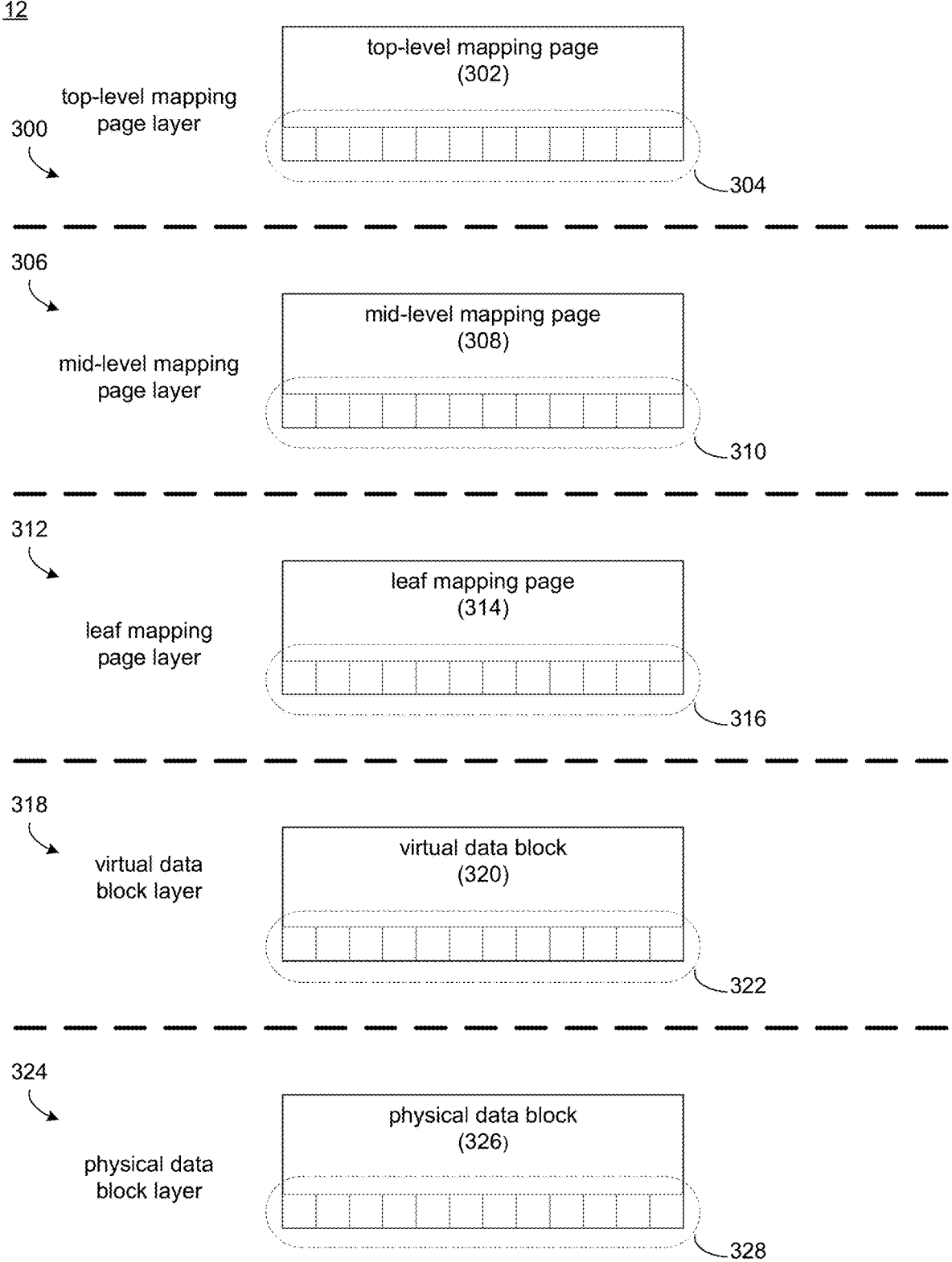
Figure 4:
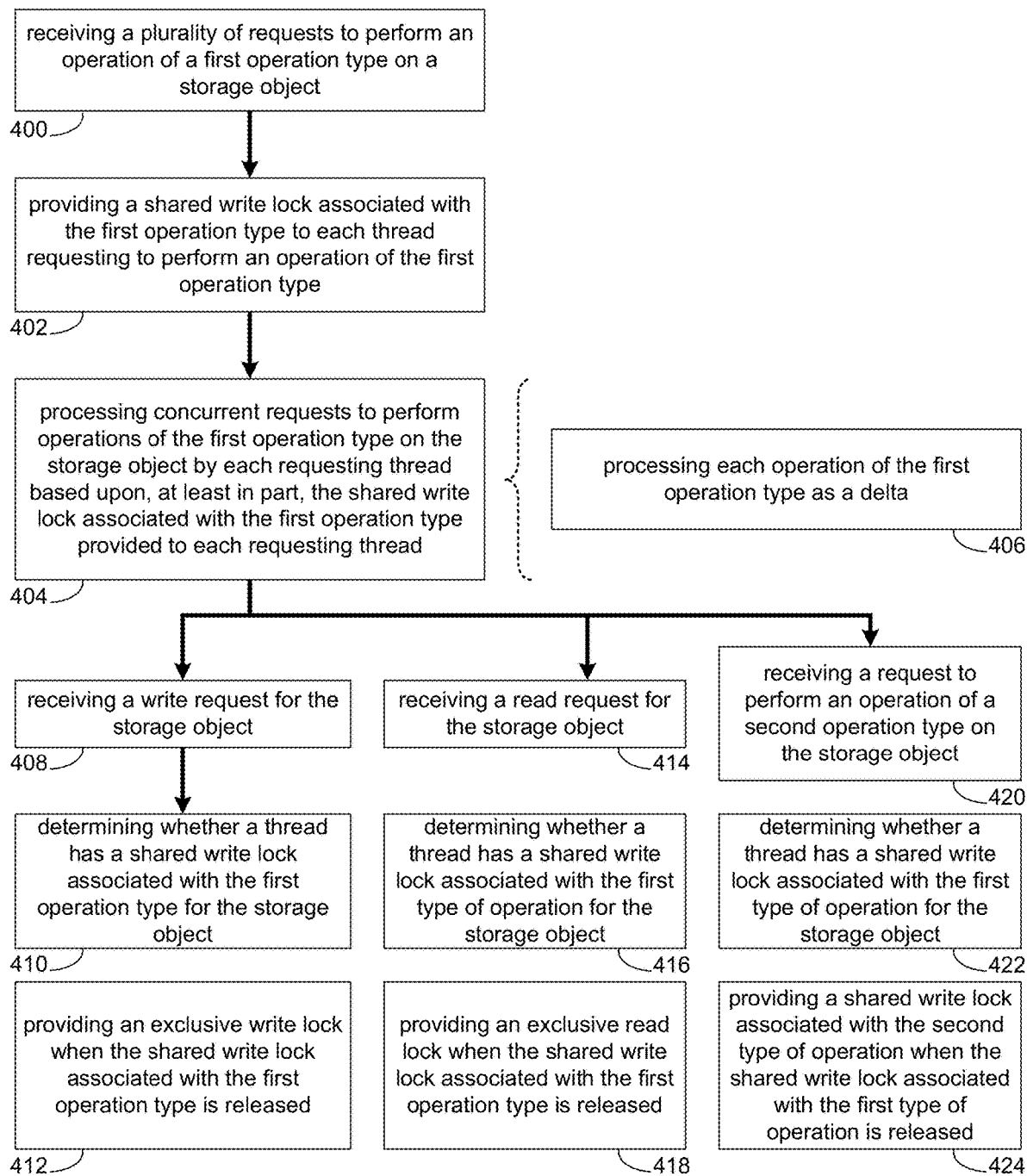
FIG. 4 is an example flowchart of the shared write lock process of FIG. 1 according to one or more example implementations of the disclosure.

Referring also to FIG. 3, a storage system may generally include a mapper layer which is structured as a file system with various layers of pages and blocks. While the following example includes metadata "blocks", it will be appreciated that other units of data storage may be used within the scope of the present disclosure. In some implementations, a top-level mapping page layer (e.g., top-level mapping page layer 300) may include top-level mapping page pages (e.g., top-level mapping page 302) with a plurality of entries (e.g., plurality of entries 304) that map or point to a plurality of entries of one or more mid-level mapping pages. A mid-level mapping page layer (e.g., mid-level mapping page layer 306) may include mid-level mapping page pages (e.g., mid-level mapping page 308) with a plurality of entries (e.g., plurality of entries 310) that map or point to a plurality of entries of one or more leaf mapping pages. A leaf mapping page layer (e.g., leaf mapping page layer 312) may include leaf mapping page pages (e.g., leaf mapping page 314) with a plurality of entries (e.g., plurality of entries 316) that map or point to a plurality of entries of one or more virtual data blocks. Leaf mapping page layer 312 may represent various ranges of Logical Block Addresses (LBAs). For example, each entry of the plurality of entries (e.g., plurality of entries 316) of the leaf mapping page (e.g., leaf mapping page 314) may be associated with a LBA range. In some implementations, the combination of top-level mapping page layer 300, mid-level mapping page layer 306, and leaf mapping page layer 312 may be organized in a "tree" data structure where each leaf mapping page is a "leaf" of the "tree" data structure that corresponds to a specific LBA range. Accordingly, each leaf mapping page (e.g., leaf mapping page 314) may hold mapping of a LBA to a virtual data block. It will be appreciated that other data structures may be used within the scope of the present disclosure to organize the first layer.

In some implementations, a virtual data block layer (e.g., second layer 318) may include virtual data blocks (e.g., virtual data block 320) with a plurality of entries (e.g., plurality of entries 322) that map to a plurality of entries of one or more physical data blocks. The virtual data block layer (e.g., virtual data block layer 318) may generally isolate the logical address of a block from the physical location of the block. For example, a virtual data block (e.g., virtual data block 308) may encapsulate the physical location of user data and allow relocation without updating leaf mapping pages (e.g., leaf mapping page 314). Accordingly, the virtual data block layer (e.g., virtual data block layer 318) may decouple the Logical Block Address space address from the physical one.

In some implementations, a physical data block layer (e.g., physical data block layer 324) may include physical data blocks (e.g., physical data block 326) with a plurality of entries or portions (e.g., plurality of entries 328) that are configured to store user data. In this manner, physical data block layer 324 may describe the physical location of user data in a storage system. In some implementations, each physical data block (e.g., physical data block 326) may have a predefined amount of storage capacity for storing data (e.g., user data).

The Lockless Reading Process:

Referring also to FIGS. 4-8 and in some implementations, shared write lock process 10 may receive 400 a plurality of requests to perform an operation of a first operation type on a storage object. A shared write lock associated with the first operation type is provided 402 to each thread requesting to perform an operation of the first operation type. Concurrent requests to perform operations of the first operation type on the storage object are processed 404 by each requesting thread based upon, at least in part, the shared write lock associated with the first operation type provided to each requesting thread.

In some implementations, shared write lock process 10 may allow for shared write locks for multithreaded applications performing the same type of operation, where a thread is a single sequential flow of control within an application executing on a computing device. For example, read and write locks are a standard method to order access to a storage object in multithreaded applications. Write access generally requires exclusive storage object ownership/lock and request serialization (i.e., a write lock should be acquired for any storage object update). Read access generally does not require request serialization and object ownership/lock may be shared (i.e., read lock should be acquired for reading the object). Read/write locks synchronization generally involves less lock contention when compared with regular, mutually exclusive locks.

For example, consider a high performance multithread application storage cluster. Storage objects (i.e., any device or memory portion configured to store data (e.g., mapping pages, data blocks, metadata pages, files, folders, etc.)) may be accessed from different types of independent flows for various operations (e.g., read operations, write operations, etc.). In some scenarios, multiple write requests may seek access to metadata pages by acquiring exclusive locks. This may cause lock contention leading to performance degradation. In one example, mapping page lock contention may occur during flushing of requests for particular mapping pages. In this example, mapping page contention prevents flushing threads from utilizing storage system resources (e.g., CPU cycles) efficiently.

In some implementations, shared write lock process 10 allows for shared write locks for particular types of operations. For example, assuming that flush granularity is not smaller than a leaf mapping page, it is guaranteed that content (i.e., virtual data blocks and/or physical data blocks) associated with the same leaf mapping page is not processed by more than one flushing thread concurrently. This means that two flushing threads cannot update the same mid-level mapping page pointer concurrently. As such, shared write lock process 10 does not serialize flushing threads for particular types of operations and the operations can be processed concurrently.

In some implementations, shared write lock process 10 may receive 400 a plurality of requests to perform an operation of a first operation type on a storage object. A request to perform an operation may generally include receiving a request (e.g., an IO request) from an application to perform a particular operation on a storage object. In some implementations, each operation is associated with a particular operation type. Examples of operation types include a leaf mapping page allocation and a virtual data block pointer update. A leaf mapping page allocation operation is an operation to generate a new leaf mapping page or to allocate additional storage for a new leaf mapping page. In this example, an application may allocate a new portion of user data (e.g., a plurality of physical data blocks). As discussed above, each physical data block may be referenced by or pointed to by one or more virtual data blocks. Each virtual data block may be referenced by or pointed to by one or more leaf mapping pages. Accordingly, when allocating new storage space or modifying existing storage space, a leaf mapping page may be allocated by a leaf mapping page allocation operation. As this type of operation does not require an exclusive lock on the storage object, shared write lock process 10 may allow for a shared write lock to share access to the storage object for operations of the same type.

A virtual data block pointer update is an operation that modifies the pointers from virtual data block to a physical data block. As discussed above, a virtual data block is a block that isolates the logical address from the physical location of user data. For example, the virtual data block encapsulates the physical location of user data and allow relocation of data without updating leaf mapping pages. In some implementations, changes in physical data blocks and/or virtual data blocks may result in changes to the pointers of a virtual data block. In one example, a virtual data block pointer update may be a portion of a de-duplication operation or a data compression operation. However, it will be appreciated that other operations may include a virtual data block pointer update within the scope of the present disclosure.

Figure 5:
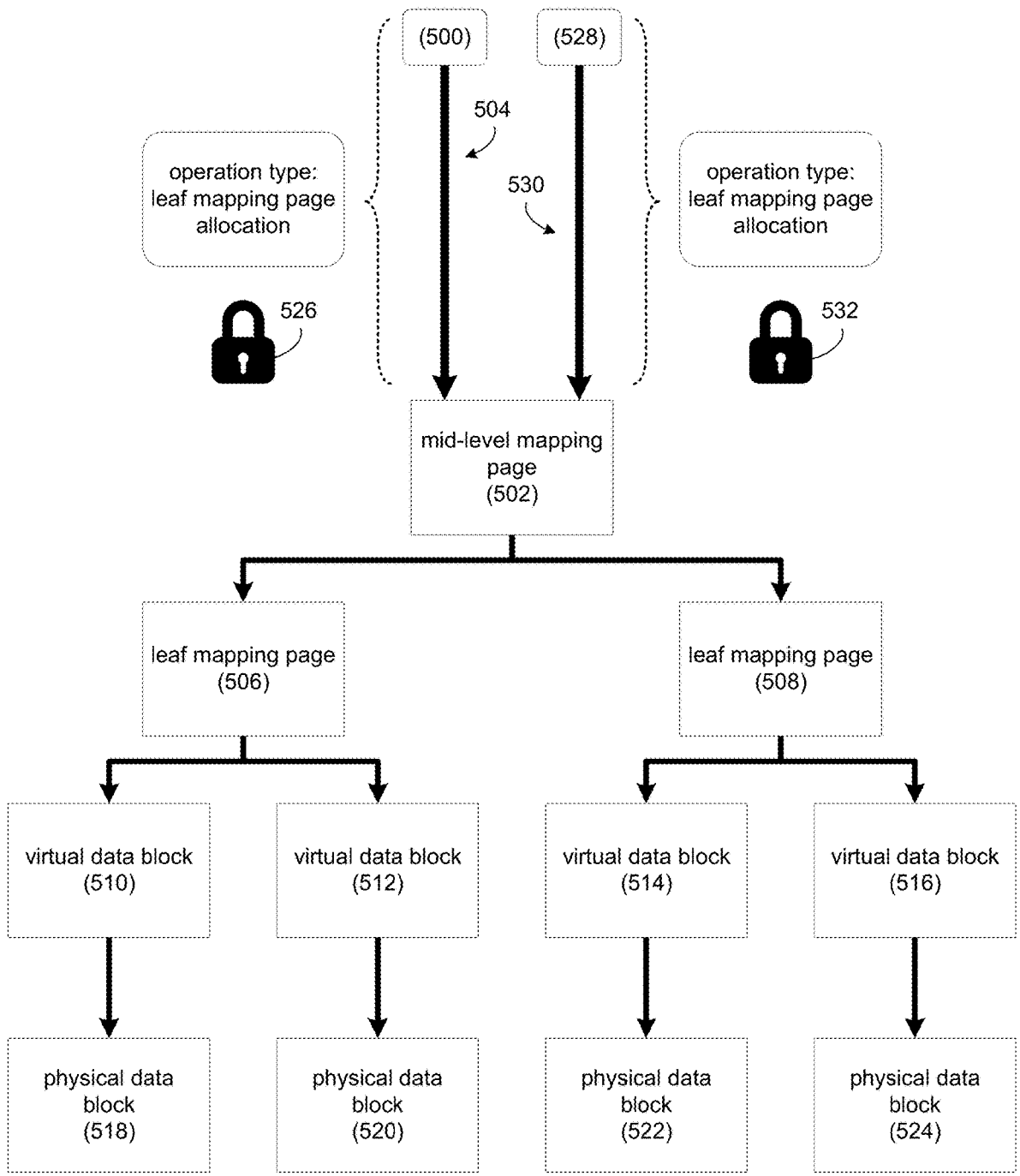
FIGS. 5-8 are example diagrammatic views of the shared write lock process of FIG. 1 according to one or more example implementations of the disclosure.
Figure 6:
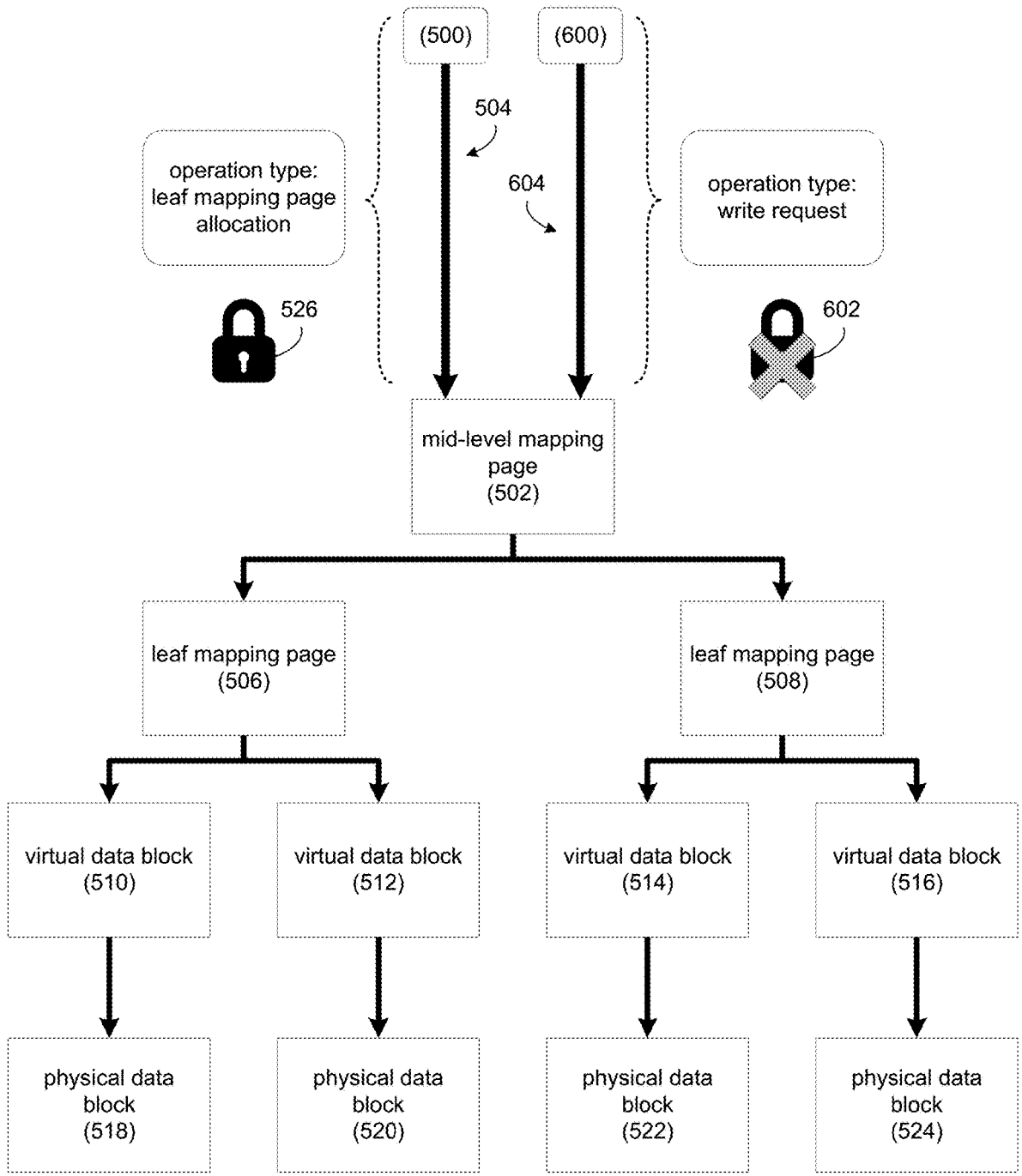
Figure 7:
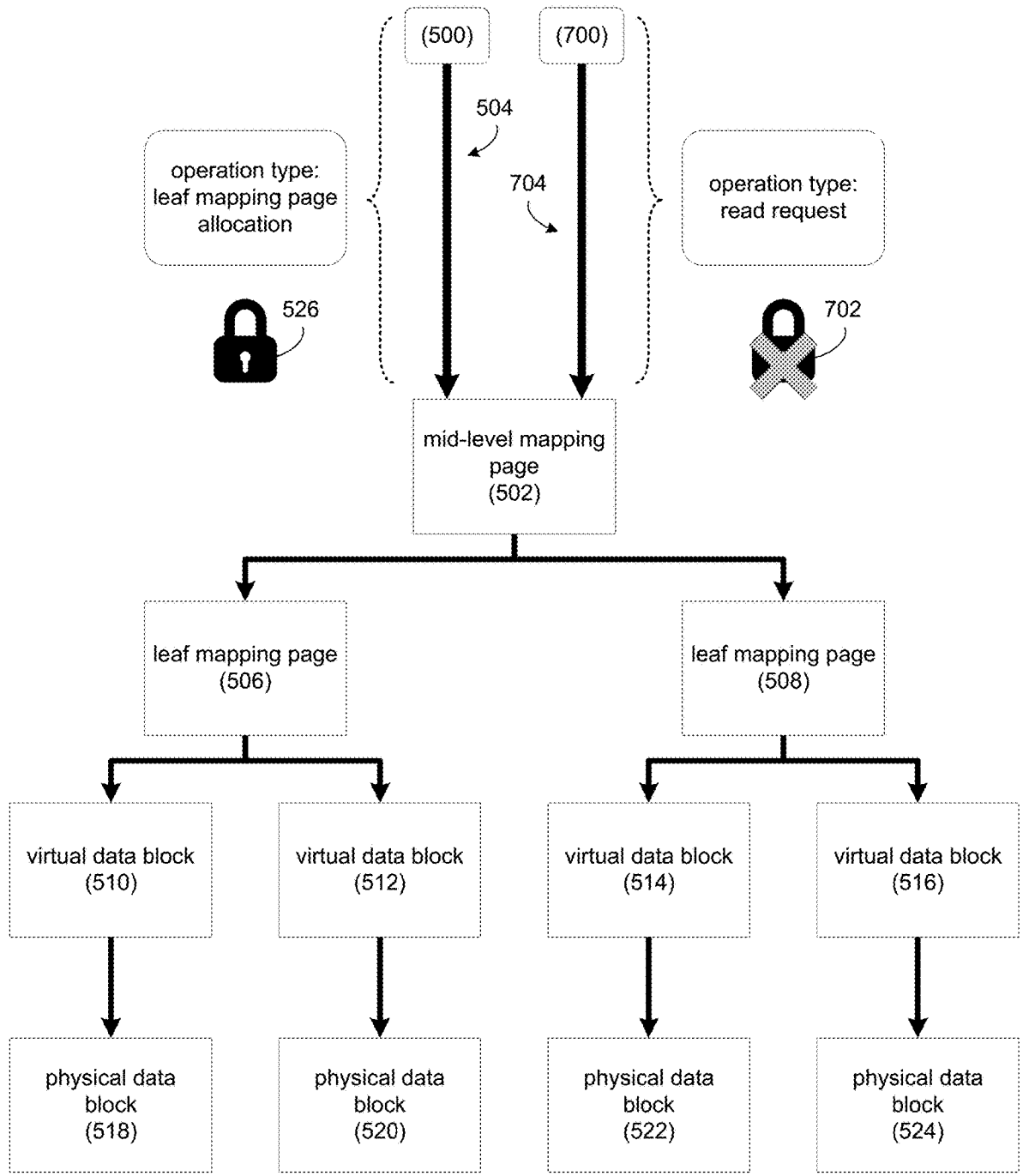

Referring also to FIG. 5 and in some implementations, suppose shared write lock process 10 receives 400 a request (e.g., request 500) to perform a particular operation on a storage object (e.g., mid-level mapping page 502). In this example, request 500 may be associated with a thread (e.g., thread 504) configured to perform the operation on the storage object. In some implementations, the operation may include performing an operation on any of mid-level mapping page 502; a leaf mapping page (e.g., leaf mapping pages 506, 508); a virtual data block (e.g., virtual data blocks 510, 512, 514, 516); and/or a physical data block (e.g., physical data blocks 518, 520, 522, 524). As such, an operation "on a mid-level mapping page" includes any operation on related page or block of the mid-level mapping page. As will be discussed in greater detail below, shared write lock process 10 may provide a shared write lock to multiple threads for performing an operation on a particular storage object.

In some implementations, shared write lock process 10 provides 402 a shared write lock associated with the first operation type to each thread requesting to perform an operation of the first operation type. A shared write lock generally includes a non-exclusive lock that prevents other threads from accessing a particular storage object. In some implementations, a shared write lock will "share" the write lock with other threads requesting an operation of the same type. In this manner, shared write lock process 10 is able to process certain operations of the same type concurrently.

Referring again to FIG. 5, suppose that shared write lock process 10 receives 400 a plurality of requests (e.g., request 500 associated with thread 504) to perform an operation of a first operation type on a storage object. In this example, suppose that request 500 is associated with performing an operation of a first operation type (e.g., leaf mapping page allocation operation). In some implementations, shared write lock process 10 provides 402 a shared write lock associated with the first operation type (e.g., shared write lock 526) to thread 504. Now suppose that shared write lock process 10 receives 400 request 528 associated with thread 530. Suppose that shared write lock process 10 determines that request 528 is associated with performing an operation of the first operation type (e.g., leaf mapping page allocation operation). In this example, because threads 504 and 530 are performing operations of the same operation type on the same storage object, shared write lock process 10 provides a shared write lock associated with the first operation type (e.g., shared write lock 532). As will be discussed in greater detail below, with the same type of shared write lock, shared write lock process 10 can concurrently process 404 the operations of each thread.

In some implementations, shared write lock process 10 processes 404 concurrent requests to perform operations of the first operation type on the storage object by each requesting thread based upon, at least in part, the shared write lock associated with the first operation type provided to each requesting thread. For example, with a shared write lock associated with the same operation type, shared write lock process 10 can concurrently process 404 requests to perform operations of the same operation type from multiple threads. Referring again to FIG. 5, shared write lock process 10 concurrently processes 404 requests (e.g., requests 500 and 528) for performing operations of the first operation type (e.g., leaf mapping page allocation operation) using threads 504 and 530.

In some implementations, processing 404 the concurrent requests includes processing 406 each operation of the first operation type as a delta. For example, when processing 404 each operation of the first operation type, updates to the same storage object from different threads are stored as "delta" updates that can be merged without data loss. In some implementations, shared write lock process 10 aggregates deltas to update a storage object (or any page or block associated with the storage object) in a batch process. In this manner, concurrent threads performing operations do not lock out other threads from performing their updates as deltas that are processed without locking the storage object. Accordingly, each concurrent requesting thread has a shared write lock that blocks or locks the storage object from operations that are not of the same operation type.

In some implementations, there are other write operation types (e.g., metadata delta log destage operations, merge operations, etc.) that generally update an entire page and require exclusive access. As with write operations, there are other read operation types (e.g., a cache miss operation) that generally require an entire page to be consistent while preventing any concurrent update. As such, when a shared write lock associated with a particular operation type is previously acquired for a storage object by another thread, shared write lock process 10 denies the granting of an exclusive lock to threads seeking to perform operations for different operation types. Further, shared write lock process 10 prevents other threads from processing operations of different operation types while a shared write lock associated with a particular operation type is held by another thread. In this manner, shared write lock process 10 allows concurrent processing of operations of a particular operation type while blocking other types of operations from being processed until the shared write lock is released.

In some implementations, shared write lock process 10 receives 408 a write request for the storage object. A write request generally includes an IO operation for adding new data to a particular storage object. In some implementations, when writing data to a particular portion of a physical data block, shared write lock process 10 locks various portions of the blocks or pages that reference the physical data block. For example and referring also to FIG. 6, suppose shared write lock process 10 receives 408 a write request for writing data to a new physical data block 518. In this example, shared write lock process 10 may receive a request to obtain an exclusive lock over particular entries of virtual data block 510, leaf mapping page 506, and/or mid-level mapping page 502 in order to guarantee consistency when writing physical data block 518.

In some implementations, shared write lock process 10 determines 410 whether a thread has a shared write lock associated with the first operation type for the storage object. For example, in response to receiving 408 a write request for a particular storage object, shared write lock process 10 determines 410 if there are any threads have a shared write lock associated with the first operation type. In some implementations, shared write lock process 10 may maintain a log of different lock types (e.g., read locks, exclusive write locks, and shared write locks) and the number of shared write locks associated with a particular operation type. For example, suppose that shared write lock process 10 receives 400 request 500 for an operation (e.g., leaf mapping page allocation) by thread 504 before receiving 408 write request 600. In this example, shared write lock process 10 provides shared write lock 526 associated with leaf mapping page allocation operations. In this example, shared write lock process 10 determines 410 that a thread (e.g., thread 504) has a shared write lock associated with the first operation type (e.g., leaf mapping page allocation). In some implementations, shared write lock process 10 maintains a shared write lock flag associated with each operation type. For example, shared write lock process 10 sets the shared write lock flag when the first shared write lock is acquired and cleared when the last shared write lock is released. In this manner, shared write lock process 10 determines 410 whether a thread has a shared write lock by checking for any shared write lock flag for each operation type.

In some implementations and in response to determining 410 that a thread has a shared write lock associated with the first operation type for the storage object, shared write lock process 10 provides 412 an exclusive write lock when the shared write lock associated with the first operation type is released. For example, suppose that shared write lock process 10 determines 410 that thread 504 has a shared write lock associated with the first operation type (e.g., shared write lock 526 associated with leaf mapping page allocation). In this example, shared write lock process 10 denies the granting of exclusive write lock 602 to thread 604 until after shared write lock 526 associated with the first operation type is released. Once shared write lock process 10 determines that shared write lock 526 is released, shared write lock process 10 provides 412 an exclusive write lock (e.g., exclusive write lock 602) to thread 604.

In some implementations, shared write lock process 10 receives 414 a read request for the storage object. A read request generally includes an IO operation for accessing data from a particular storage object. In one example, suppose shared write lock process 10 receives a cache miss operation. In this example, shared write lock process 10 locks various portions of the blocks or pages that reference the physical data block where the requested data is located. For example and referring also to FIG. 7, suppose shared write lock process 10 receives 414 a read request for accessing data from physical data block 522. In this example, shared write lock process 10 may receive a request to obtain an exclusive lock over particular entries of virtual data block 514, leaf mapping page 508, and/or mid-level mapping page 502 in order to guarantee consistency when reading data from physical data block 522.

In some implementations, shared write lock process 10 determines 416 whether a thread has a shared write lock associated with the first operation type for the storage object. For example, in response to receiving 414 a read request for a particular storage object, shared write lock process 10 determines 416 if there are any threads have a shared write lock associated with the first operation type. Suppose that shared write lock process 10 receives 400 request 500 for an operation (e.g., leaf mapping page allocation) by thread 504 before receiving 414 read request 700. In this example, shared write lock process 10 provides shared write lock 526 associated with leaf mapping page allocation operations. In this example, shared write lock process 10 determines 416 that a thread (e.g., thread 504) has a shared write lock associated with the first operation type (e.g., leaf mapping page allocation).

In some implementations and in response to determining 416 that a thread has a shared write lock associated with the first operation type for the storage object, shared write lock process 10 provides 418 a read lock when the shared write lock associated with the first operation type is released. For example, suppose that shared write lock process 10 determines 416 that thread 504 has a shared write lock associated with the first operation type (e.g., shared write lock 526 associated with leaf mapping page allocation). In this example, shared write lock process 10 denies the granting of read lock 702 to thread 704 until after shared write lock 526 associated with the first operation type is released. Once shared write lock process 10 determines that shared write lock 526 is released, shared write lock process 10 provides 418 a read lock (e.g., read lock 702) to thread 704.

Figure 8:
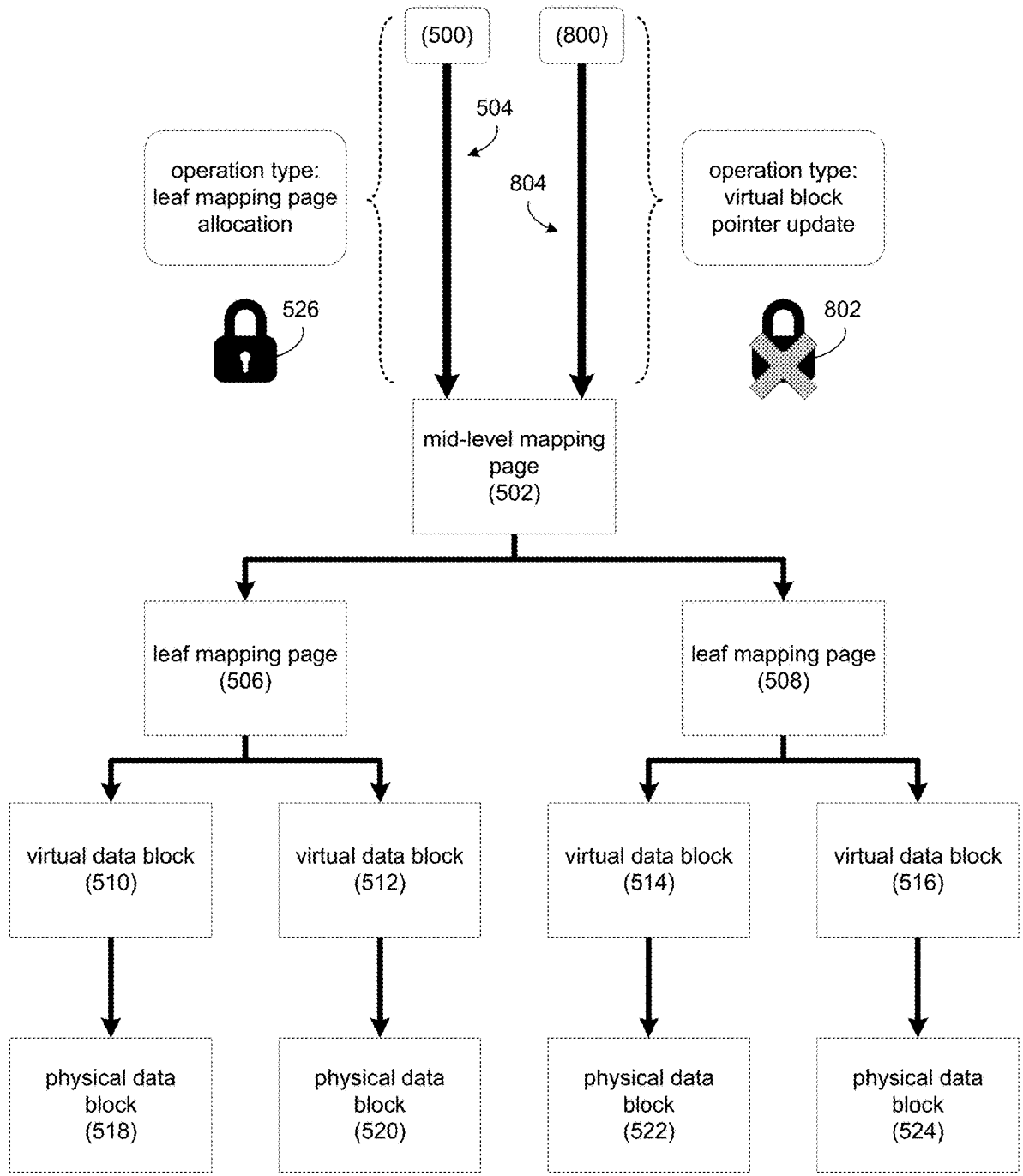

In some implementations, shared write lock process 10 receives 420 a request to perform an operation of a second operation type on the storage object. For example, shared write lock process 10 may receive requests to perform operations that do not normally require exclusive locks on the storage object. In one example, suppose shared write lock process 10 receives a request to perform a virtual data block pointer update operation. Referring also to FIG. 8, suppose shared write lock process 10 receives 420 a request for updating virtual data block pointers for virtual data block 516. In this example, shared write lock process 10 may receive 420 a request to obtain a shared write lock over particular entries of virtual data block 516, leaf mapping page 508, and/or mid-level mapping page 502.

In some implementations, shared write lock process 10 determines 422 whether a thread has a shared write lock associated with the first type of operation for the storage object. For example, in response to receiving 420 a request to perform an operation of a second operation type for a particular storage object, shared write lock process 10 determines 422 if there are any threads have a shared write lock associated with the first operation type. Suppose that shared write lock process 10 receives 400 request 500 for an operation (e.g., leaf mapping page allocation) by thread 504 before receiving 420 request 800 to perform a virtual data block pointer update operation. In this example, shared write lock process 10 provides shared write lock 526 associated with leaf mapping page allocation operations. In this example, shared write lock process 10 determines 422 that a thread (e.g., thread 504) has a shared write lock associated with the first operation type (e.g., leaf mapping page allocation).

In some implementations and in response to determining that the thread has a shared write lock associated with the first operation type for the storage object, shared write lock process 10 provides 424 a shared write lock associated with the second type of operation when the shared write lock associated with the first type of operation is released. For example, suppose that shared write lock process 10 determines 422 that thread 504 has a shared write lock associated with the first operation type (e.g., shared write lock 526 associated with leaf mapping page allocation). In this example, shared write lock process 10 denies the granting of shared write lock 802 to thread 804 until after shared write lock 526 associated with the first operation type is released. Once shared write lock process 10 determines that shared write lock 526 is released, shared write lock process 10 provides 424 a shared write lock (e.g., shared write lock 802) to thread 804.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    receiving a plurality of requests to perform an operation of a first operation type on a storage object;
    providing a shared write lock associated with the first operation type to each thread requesting to perform an operation of the first operation type;
    processing concurrent requests to perform operations of the first operation type on the storage object by each requesting thread based upon, at least in part, the shared write lock associated with the first operation type provided to each requesting thread;
    receiving a write request for the storage object;
    determining whether a thread has a shared write lock associated with the first operation type for the storage object; and
    in response to determining that the thread has the shared write lock associated with the first operation type for the storage object, providing an exclusive write lock when the shared write lock associated with the first operation type is released.

2. The computer-implemented method of claim 1, wherein the first operation type is a leaf mapping page allocation operation.

3. The computer-implemented method of claim 1, wherein the first operation type is a virtual data block pointer update operation.

4. The computer-implemented method of claim 1, wherein processing the concurrent requests includes processing each operation of the first operation type as a delta.

5. The computer implemented method of claim 1, further comprising:
    receiving a read request for the storage object;
    determining that a thread has a shared write lock associated with the first operation type for the storage object; and
    in response to determining that the thread has the shared write lock associated with the first operation type for the storage object, providing a read lock when the shared write lock associated with the first operation type is released.

6. The computer implemented method of claim 1, further comprising:
    receiving a request to perform an operation of a second operation type on the storage object;
    determining whether a thread has a shared write lock associated with the first type of operation for the storage object; and
    in response to determining that the thread has the shared write lock associated with the first operation type for the storage object, providing a shared write lock associated with the second type of operation when the shared write lock associated with the first type of operation is released.

7. A computer program product residing on a non-transitory computer readable medium having a plurality of instructions stored thereon which, when executed by a processor, cause the processor to perform operations comprising:
    receiving a plurality of requests to perform an operation of a first operation type on a storage object;
    providing a shared write lock associated with the first operation type to each thread requesting to perform an operation of the first operation type; and
    processing concurrent requests to perform operations of the first operation type on the storage object by each requesting thread based upon, at least in part, the shared write lock associated with the first operation type provided to each requesting thread;
    receiving a read request for the storage object;
    determining whether a thread has a shared write lock associated with the first operation type for the storage object; and
    in response to determining that the thread has the shared write lock associated with the first operation type for the storage object, providing a read lock when the shared write lock associated with the first operation type is released.

8. The computer program product of claim 7, wherein the first operation type is a leaf mapping page allocation operation.

9. The computer program product of claim 7, wherein the first operation type is a virtual data block pointer update operation.

10. The computer program product of claim 7, wherein processing the concurrent requests includes processing each operation of the first operation type as a delta.

11. The computer program product of claim 7, wherein the operations further comprise:
receiving a write request for the storage object;
determining that a thread has a shared write lock associated with the first operation type for the storage object; and
in response to determining that the thread has a shared write lock associated with the first operation type for the storage object, providing an exclusive write lock when the shared write lock associated with the first operation type is released.

12. The computer program product of claim 7, wherein the operations further comprise:
receiving a request to perform an operation of a second operation type on the storage object;
determining whether a thread has a shared write lock associated with the first type of operation for the storage object; and
in response to determining that the thread has the shared write lock associated with the first operation type for the storage object, providing a shared write lock associated with the second type of operation when the shared write lock associated with the first type of operation is released.

13. A computing system comprising:
a memory; and
a processor configured to receive a plurality of requests to perform an operation of a first operation type on a mid-level mapping page, wherein the processor is further configured to provide a shared write lock associated with the first operation type to each thread requesting to perform an operation of the first operation type, wherein the processor is further configured to process concurrent requests to perform operations of the first operation type on the mid-level mapping page by each requesting thread based upon, at least in part, the shared write lock associated with the first operation type provided to each requesting thread, wherein the processor is further configured to receive a request to perform an operation of a second operation type on the storage object, wherein the processor is further configured to determine that a thread has a shared write lock associated with the first type of operation for the storage object, and wherein the processor is further configured to, in response to determining that the thread has the shared write lock associated with the first operation type for the storage object, provide a shared write lock associated with the second type of operation when the shared write lock associated with the first type of operation is released.

14. The computing system of claim 13, wherein the first operation type is a leaf mapping page allocation operation.

15. The computing system of claim 13, wherein the first operation type is a virtual data block pointer update operation.

16. The computing system of claim 13, wherein processing the concurrent requests includes processing each operation of the first operation type as a mid-level mapping page delta.

17. The computing system of claim 13, wherein the processor is further configured to:
receive a write request for the mid-level mapping page;
determine whether a thread has a shared write lock associated with the first operation type for the mid-level mapping page; and
in response to determining that the thread has the shared write lock associated with the first operation type for the mid-level mapping page, provide an exclusive write lock when the shared write lock associated with the first operation type is released.

18. The computing system of claim 13, wherein the processor is further configured to:
receive a read request for the mid-level mapping page;
determine whether a thread has a shared write lock associated with the first operation type for the mid-level mapping page; and
in response to determining that the thread has the shared write lock associated with the first operation type for the mid-level mapping page, provide a read lock when the shared write lock associated with the first operation type is released.

\* \* \* \* \*